(12) United States Patent
Adachi

(10) Patent No.: US 10,852,470 B2
(45) Date of Patent: Dec. 1, 2020

(54) PLANAR ILLUMINATION DEVICE AND METHOD OF MANUFACTURING A PLANAR ILLUMINATION DEVICE

(71) Applicant: MINEBEA MITSUMI Inc., Nagano (JP)

(72) Inventor: Kazumasa Adachi, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/281,282

(22) Filed: Feb. 21, 2019

(65) Prior Publication Data

US 2019/0271807 A1 Sep. 5, 2019

(30) Foreign Application Priority Data

Mar. 2, 2018 (JP) .................. 2018-037598
Jun. 8, 2018 (JP) .................. 2018-110686

(51) Int. Cl.
*F21V 8/00* (2006.01)
(52) U.S. Cl.
CPC ......... *G02B 6/0091* (2013.01); *G02B 6/0068* (2013.01)
(58) Field of Classification Search
None
See application file for complete search history.

(56) References Cited

U.S. PATENT DOCUMENTS

| 2015/0036385 A1 | 2/2015 | Kawai |
| 2015/0153781 A1 | 6/2015 | Yang et al. |
| 2016/0313487 A1 | 10/2016 | Wang et al. |
| 2017/0371095 A1 | 12/2017 | Tokunaga et al. |

FOREIGN PATENT DOCUMENTS

| CN | 203980007 U | 12/2014 |
| CN | 104679317 A | 6/2015 |
| CN | 107544111 A | 1/2018 |
| JP | 2007-059386 A | 3/2007 |
| JP | 2007-250197 A | 9/2007 |
| JP | 2016-139559 A | 8/2016 |

(Continued)

OTHER PUBLICATIONS

Notice of Reasons for Refusal dated Feb. 4, 2020 for corresponding Japanese Application No. 2018-110686 and English translation.

(Continued)

*Primary Examiner* — Britt D Hanley
(74) *Attorney, Agent, or Firm* — Pearne & Gordon LLP

(57) ABSTRACT

A planar illumination device according to an embodiment includes a light guide plate, light sources, and a fixation member with a strip shape. The light guide plate outputs light that is incident on a side surface thereof from one principal surface among two principal surfaces thereof. The light sources face the side surface, are arrayed to be spaced apart in a longitudinal direction of the side surface, and have light-emitting surfaces that emit light that is incident on the side surface. The fixation member is arranged between the light guide plate and another member and fixes the light guide plate to the other member. The fixation member is bonded to regions on the light guide plate that are each located anteriorly between two adjacent light sources in mutually different combinations and that are located to be spaced apart in an array direction of the light sources.

13 Claims, 8 Drawing Sheets

(56) References Cited

FOREIGN PATENT DOCUMENTS

| | | |
|---|---|---|
| JP | 2017-144576 A | 8/2017 |
| JP | 2018-006322 A | 1/2018 |

OTHER PUBLICATIONS

Notice of Reasons for Refusal dated May 27, 2020 for corresponding Japanese Application No. 2018-110686 and English translation.
First Office Action dated Jul. 13, 2020 for corresponding Chinese Application No. 201910144800.3 and English translation.
Decision to Grant a Patent dated Aug. 6, 2020 for corresponding Japanese Application No. 2018-110686 and English translation.

PLANAR ILLUMINATION DEVICE AND METHOD OF MANUFACTURING A PLANAR ILLUMINATION DEVICE

CROSS-REFERENCE TO RELATED APPLICATION

The present application is based upon, and claims the benefit of priority to, Japanese Patent Application No. 2018-037598 filed in Japan on Mar. 2, 2018 and Japanese Patent Application No. 2018-110686 filed in Japan on Jun. 8, 2018, the entire contents of which are herein incorporated by reference.

BACKGROUND OF THE INVENTION

1. Field of the Invention

The present invention relates to a planar illumination device and a method of manufacturing a planar illumination device.

2. Description of the Related Art

There is a planar illumination device where a top-view-type Light Emitting Diode (LED) or a side-view-type LED is arranged so as to face a light incidence surface of a light guide plate. In recent years, with a need to narrow a frame of a planar illumination device, it is desired that a fixation member that fixes a light guide plate to another member (for example, a frame, a substrate, or another fixation member that is boned to such a frame or substrate) is narrowed.

Japanese Patent Application Publication No. 2016-139559

However, as a fixation member that fixes a light guide plate to another member is narrowed, it is difficult to handle such a fixation member, so that there is room for improvement in workability for assembly thereof.

SUMMARY OF THE INVENTION

A planar illumination device according to an aspect of the present invention includes a light guide plate, a plurality of light sources, and a fixation member with a strip shape. The light guide plate outputs light that is incident on a side surface thereof from one principal surface among two principal surfaces thereof. The plurality of light sources face the side surface, are arrayed to be spaced apart in a longitudinal direction of the side surface, and have light-emitting surfaces that emit light that is incident on the side surface. The fixation member is arranged between the light guide plate and another member and fixes the light guide plate to the other member. The fixation member is bonded to a plurality of regions on the light guide plate that are each located anteriorly between two adjacent light sources in mutually different combinations and that are located to be spaced apart in an array direction of the plurality of light sources.

DETAILED DESCRIPTION OF THE PREFERRED EMBODIMENT

Hereinafter, a planar illumination device and a method of manufacturing a planar illumination device according to an embodiment will be explained with reference to the drawings. Additionally, an application of a planar illumination device and a method of manufacturing a planar illumination device is not limited by an embodiment as explained below. Furthermore, the drawings are schematic where it has to be noted that a relationship among dimensions of respective elements, a ratio of respective elements, or the like may be different from actual one. Moreover, parts with mutually different relations of dimensions or ratios may also be included among mutual drawings. Furthermore, for simplicity of an explanation, a three-dimensional orthogonal coordinate system that includes a Z-axis where a vertically upward direction is a positive direction and a vertically downward direction is a negative direction may be illustrated in each drawing.

Outline of Planar Illumination Device

Figure 1:
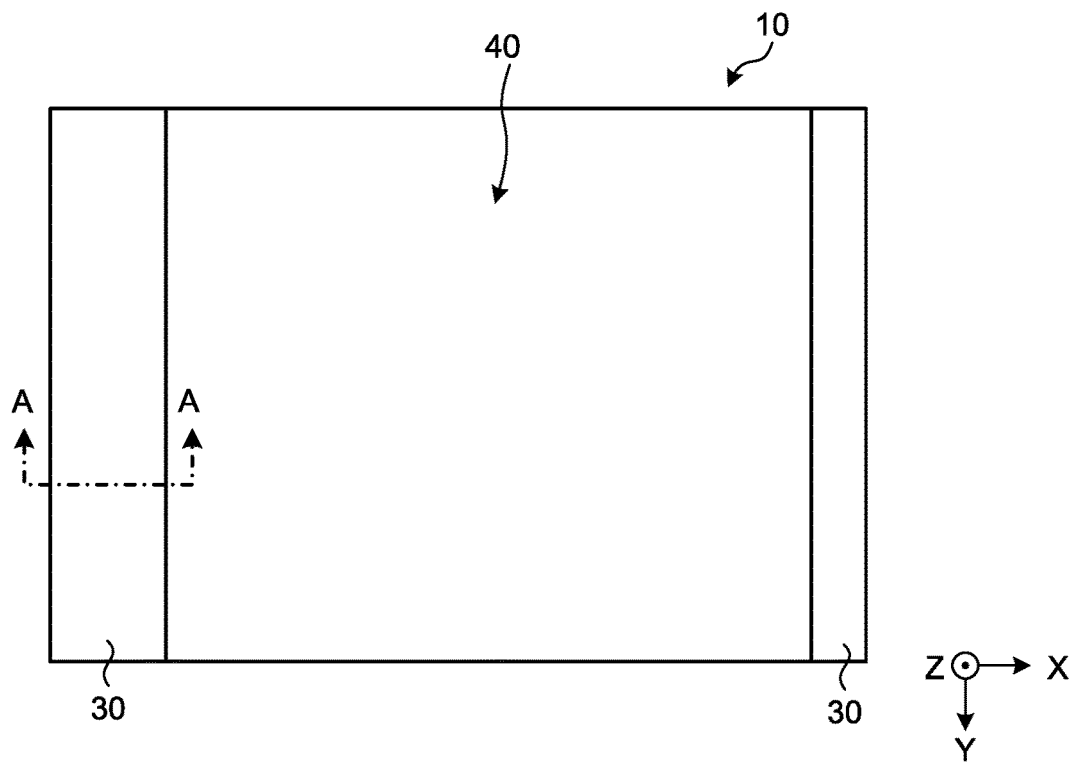
FIG. 1 is a plan view illustrating an example of an appearance of a planar illumination device according to an embodiment.

First, an outline of a planar illumination device 10 will be explained by using FIG. 1. FIG. 1 is a plan view illustrating an example of an appearance of the planar illumination device 10 according to an embodiment. As illustrated in FIG. 1, the planar illumination device 10 according to an embodiment outputs light from an effective area 40 that is an output area that is not covered by a light-shielding sheet 30. That is, the effective area 40 is defined by the light-shielding sheet 30.

The planar illumination device 10 according to an embodiment is used as a backlight of a liquid crystal display device. Such a liquid crystal display device is used in, for example, a smartphone.

Additionally, in FIG. 1, a width of a light-shielding sheet 30 on a left side is greater than that of a light-shielding sheet 30 on a right side. This is because the light-shielding sheet 30 on a right side covers a comparatively narrow region that does not include a Flexible Printed Circuit (FPC) 12, an LED 14, or the like as described later while the light-shielding sheet 30 on a left side covers a comparatively wide region that includes the FPC 12, the LED 14, or the like, as described later. A width of the light-shielding sheet 30 on a left side is, for example, less than or equal to 2.5 mm.

Detailed Configuration of Planar Illumination Device

Figure 2:
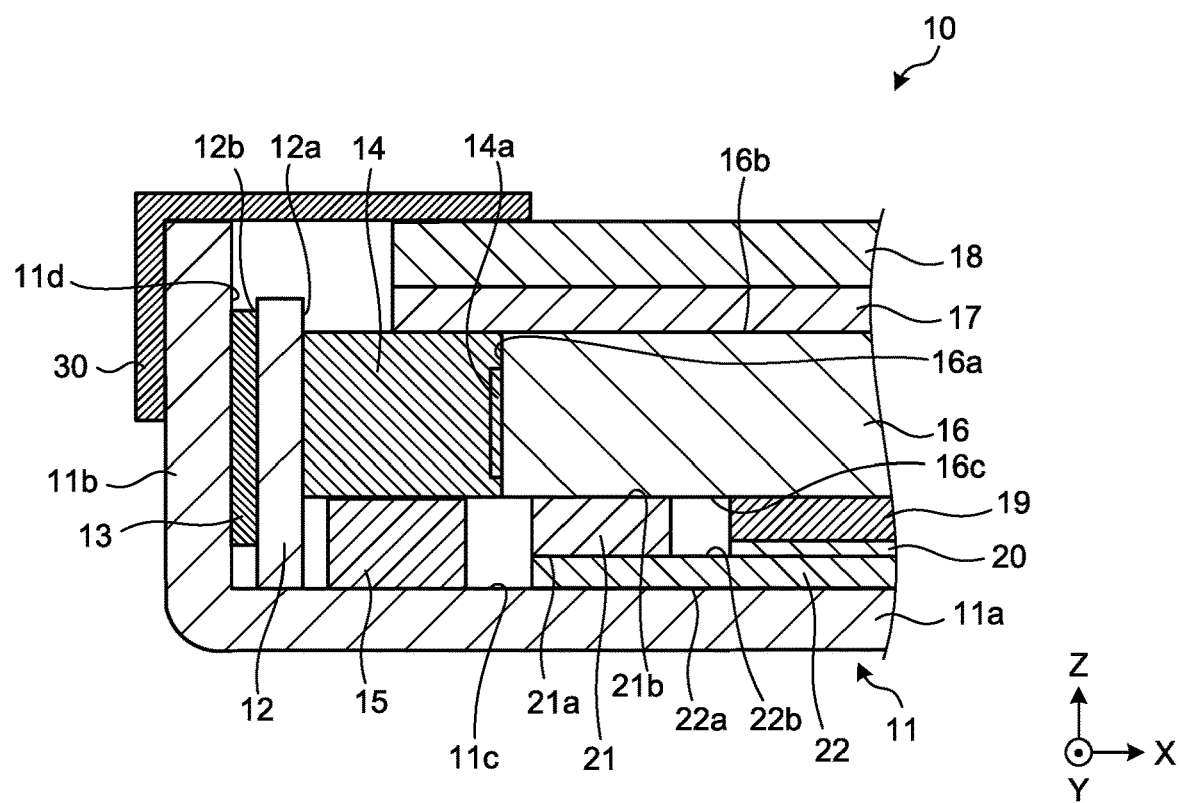
FIG. 2 is a diagram illustrating an example of a cross-section along line A-A in FIG. 1.

Next, a detailed configuration of a planar illumination device 10 will be explained by using FIG. 2. FIG. 2 is a diagram illustrating an example of a cross-section along line A-A in FIG. 1. As illustrated in FIG. 2, the planar illumination device 10 includes a frame 11, an FPC 12, a fixation member 13, a plurality of LEDs 14, a connection member 15, a light guide plate 16, a diffusion sheet 17, a prism sheet 18, a reflective sheet 19, a fixation member 20, a fixation member 21, a fixation member 22, and a light-shielding sheet 30. Additionally, a solder that connects the FPC 12 and an LED 14 is not illustrated in an example as illustrated in FIG. 2.

The frame 11 is a member that stores the FPC 12, the fixation member 13, the plurality of LEDs 14, the connection member 15, the light guide plate 16, the diffusion sheet 17, the prism sheet 18, the reflective sheet 19, the fixation member 20, the fixation member 21, and the fixation member 22. The frame 11 is a sheet-metal frame with a high rigidity that is made of, for example, a stainless steel. The frame 11 has a bottom part 11a and a sidewall part 11b.

The bottom part 11a is a site that extends along a principal surface 16c of the light guide plate 16 as described later. The bottom part 11a has a floor surface 11c. The floor surface 11c supports the LED 14 or the light guide plate 16 via the connection member 15 or the fixation members 21, 22. The sidewall part 11b is a site that integrally rises from the bottom part 11a to a direction where light outputs from the light guide plate 16 (a normal direction of the floor surface 11c) in a longitudinal direction of a side surface 16a of the light guide plate 16 as described later. The sidewall part 11b has a side surface 11d.

The FPC 12 is a substrate that has two principal surfaces 12a, 12b where the plurality of LEDs 14 are mounted on one principal surface 12a. A predetermined wiring pattern (non-illustrated) is formed on the FPC 12 where electric power from an external power source (non-illustrated) is supplied to the LED 14 via such a wiring pattern so that it is possible to cause the LED 14 to emit light. Additionally, the FPC 12 is an example of a substrate and may be a (rigid) substrate with rigidity.

The fixation member 13 is a member that fixes the FPC 12 to the side surface 11d of the frame 11. The fixation member 13 is, for example, a double-sided tape. Then, one surface of the fixation member 13 is attached to the principal surface 12b on an opposite side of the principal surface 12a of the FPC 12 and the other surface is attached to the side surface 11d, so that the FPC 12 is fixed to the side surface 11d.

The LED 14 is a light source that is point-like (a pseudo-like light source). The LED 14 is, for example, a pseudo-white LED that is composed of a blue LED and a yellow phosphor. The LED 14 is a so-called top-view-type LED that is formed into a rectangular parallelepiped shape as a whole and has a light-emitting surface 14a on a surface on an opposite side of a surface that is mounted on the FPC 12.

The plurality of LEDs 14 are provided. Furthermore, the plurality of LEDs 14 are arrayed in a long side direction of the side surface 16a (a Y-axis direction) in a state where their light-emitting surfaces 14a face the side surface 16a of the light guide plate 16. Then, the plurality of LEDs 14 emit light toward the side surface 16a. Thus, the plurality of LEDs 14 emit light that is incident on the side surface 16a.

The connection member 15 is, for example, a single-sided tape with a strip shape that has an adhesive surface on one surface thereof. The connection member 15 includes, for example, a base material and an adhesive layer. A base material of the connection member 15 is, for example, Polyethylene Terephthalate (PET). An adhesive layer of the connection member 15 is, for example, a silicone or an acryl and is bonded to at least a part of a surface of the LED 14 on a side of the floor surface 11c. Additionally, the connection member 15 is not limited to a single-sided tape and may be, for example, a double-sided tape or the like.

The light guide plate 16 is formed into a flat plate shape by using a transparent material (for example, a polycarbonate resin). The light guide plate 16 has the side surface 16a and two principal surfaces 16b, 16c on an outer surface thereof.

The side surface 16a is an incident surface where light that is emitted by the LED 14 from the light-emitting surface 14a of the LED 14 is incident thereon. Furthermore, the principal surface 16b is an output surface where light that is incident on the side surface 16a is output therefrom to an outside thereof. Moreover, a light path changing pattern that is composed of, for example, a plurality of dots is formed on the principal surface 16c that is a surface on an opposite side of the principal surface 16b.

Such a light path changing pattern is formed so that a direction of travel of light that travels in the light guide plate 16 is changed and such light is efficiently output from the principal surface 16b. That is, the planar illumination device 10 according to an embodiment is a so-called edge-light-type illumination device.

The diffusion sheet 17 is arranged on a side of the principal surface 16b of the light guide plate 16 and diffuses light that is output from the principal surface 16b. As a specific example is provided for an explanation, the diffusion sheet 17 is arranged so as to cover the principal surface 16b and at least a part of a surface of the LED 14 on an opposite side of the floor surface 11c and diffuses light that is output from the principal surface 16b.

The prism sheet 18 is arranged on an opposite side of the light guide plate 16 with respect to the diffusion sheet 17 and executes control of a distribution of light that is diffused by the diffusion sheet 17 to output light with distribution control having been executed.

The light-shielding sheet 30 is arranged so as to cover a part of the prism sheet 18 on a side of the sidewall part 11b and shields light that is output from a certain region of the principal surface 16b of the light guide plate 16 so as to define the effective area 40 (see FIG. 1) where light is output from the planar illumination device 10.

The reflective sheet 19 reflects light that leaks from the principal surface 16c of the light guide plate 16 on an opposite side of the principal surface 16b (an output surface), and returns it to the light guide plate 16 again. The reflective sheet 19 is arranged between the principal surface 16c of the light guide plate 16 and the floor surface 11c in a state where it is fixed on the floor surface 11c of the frame 11 by the fixation member 20.

The fixation member 20 is, for example, a white double-sided tape where one surface thereof is attached to a part of the reflective sheet 19 and the other surface is attached to the fixation member 22. Thereby, the reflective sheet 19 is fixed on the floor surface 11c via the fixation member 20 and the fixation member 22.

Figure 3:
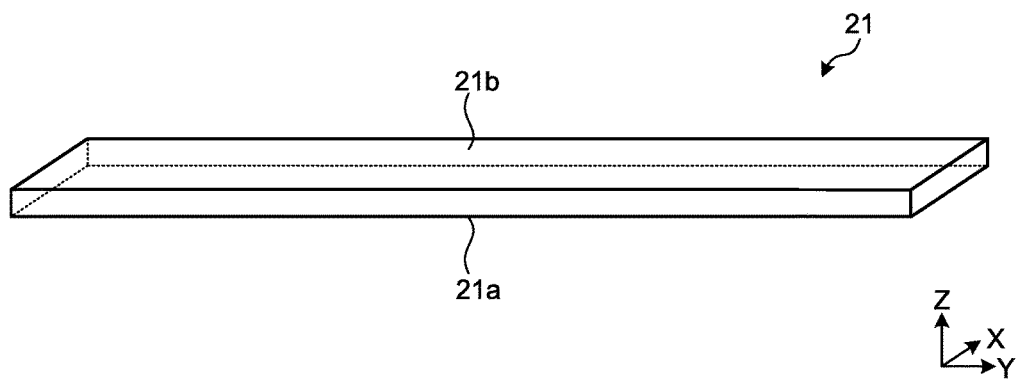
FIG. 3 is a diagram illustrating an example of a configuration of a fixation member according to an embodiment.

The fixation member 21 is a fixation member with a strip shape, is arranged between the light guide plate 16 and the fixation member 22 (an example of another member), and is bonded to the light guide plate 16 and the fixation member 22. One surface 21a of the fixation member 21 that faces the fixation member 22 is a flat surface and the other surface 21b that faces the principal surface 16c of the light guide plate 16 is also a flat surface. FIG. 3 is a diagram illustrating an example of a configuration of the fixation member 21 according to an embodiment.

The fixation member 21 includes a thermal activation member that is activated at a low temperature (for example, 80 degrees to 100 degrees). For example, the fixation member 21 is a thermal activation double-sided bonding tape or an elastomer. A thermal activation double-sided bonding tape is, for example, a thermal activation double-sided bonding film that does not have a base material but is composed of a low-temperature activation adhesive, a tape configured by applying a low-temperature activation adhesive on a polyurethane-coated paper or a polyethylene-coated paper, or a tape configured by applying a low-temperature activation adhesive on an acrylic non-woven fabric. Furthermore, an elastomer is, for example, a thermosetting elastomer (for example, a thermosetting-resin-type elastomer) or a thermoplastic elastomer.

The fixation member 21 is preferable as a boding strength per unit area thereof is high. It is possible for a thermal activation double-sided bonding tape to have a bonding strength per unit area that is higher than that of an elastomer, so that it is preferable to use a thermal activation double-sided bonding tape as the fixation member 21.

The fixation member 22 as illustrated in FIG. 2 is, for example, a single-sided tape that has an adhesive layer on one surface thereof. For example, a base material and an adhesive layer are included therein. A base material of the fixation member 22 is, for example, PET. An adhesive layer of the fixation member 22 is, for example, a silicone or an acryl. Additionally, the fixation member 22 is not limited to a single-sided tape and may be, for example, a double-sided tape or the like.

A surface area of the fixation member 22 is greater than that of the fixation member 21 and one surface 22a thereof is bonded to the floor surface 11c of the frame 11. One surface 21a of the fixation member 21 is welded to an end portion of the other surface 22b of the fixation member 22 on a side of the LED 14 and a plurality of regions 21c (see FIG. 7) as described later on the other surface 21b that face a plurality of regions 16d (see FIG. 4) as described later on the light guide plate 16 are welded to the plurality of regions 16d on the light guide plate 16. Additionally, the respective surfaces 21a, 21b, 22a, 22b are flat surfaces.

As illustrated in FIG. 2, the light guide plate 16 is fixed to the frame 11 by the fixation members 21, 22 independently of the LED 14. Hence, it is possible to detach a unit on a side of the light guide plate 16 (for example, a unit that includes the reflective sheet 19, the fixation member 20, and the fixation members 21, 22) without detaching the LED 14. Thereby, it is possible to readily execute reworking to replace a unit that includes the light guide plate 16.

Figure 4:
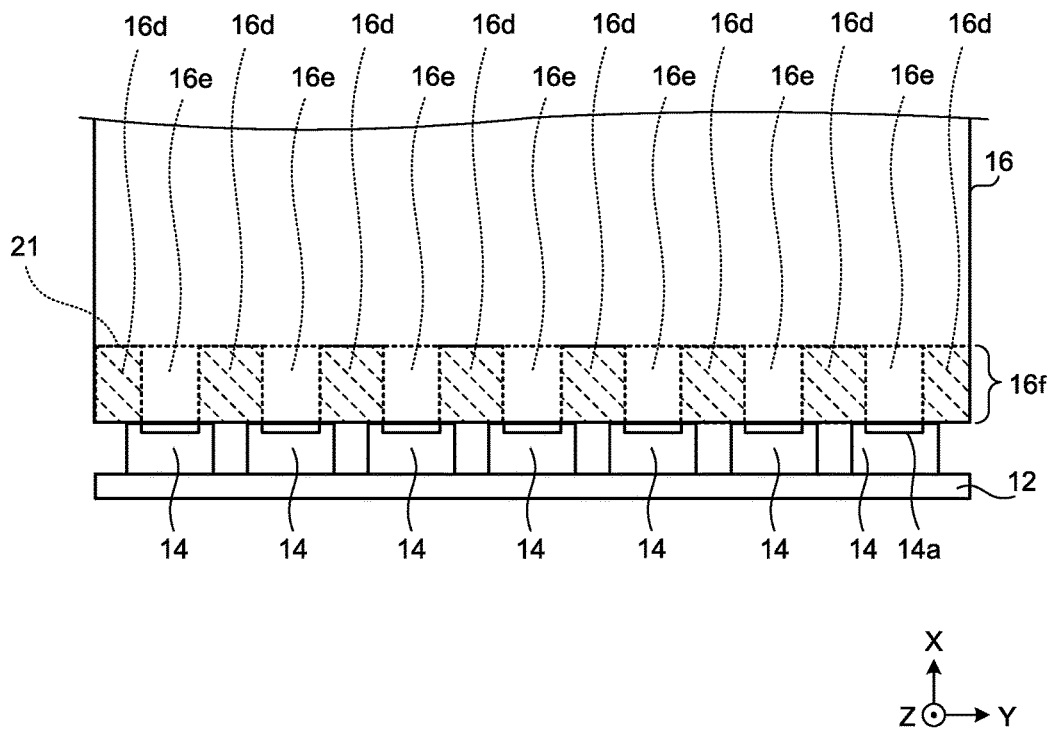
FIG. 4 is a diagram illustrating a relationship among an LED, a light guide plate, and a fixation member in a planar illumination device according to an embodiment.

FIG. 4 is a diagram illustrating a relationship among the LED 14, the light guide plate 16, and the fixation member 21 in the planar illumination device 10 according to an embodiment. As illustrated in FIG. 4, the fixation member 21 is arranged so as to face a region 16f of the light guide plate 16 near the LED 14 and a certain region that faces the region 16f is welded thereto.

Specifically, the fixation member 21 is welded and fixed to the plurality of regions 16d of the light guide plate 16 that are each located anteriorly (in an X-axis positive direction) between two adjacent LEDs 14 in mutually different combinations and that are located so as to be spaced apart in an array direction of the plurality of LEDs 14 (in a Y-axis direction). Welding of the fixation member 21 to the plurality of regions 16d is executed by ultrasonic welding.

Thus, the fixation member 21 is welded to the light guide plate 16, so that it is possible to improve a strength of bonding to the light guide plate 16 relative to fixation that uses a conventional adhesive fixation member. Hence, even in a case where the region 16d on the light guide plate 16 that is used for fixation to the frame 11 is reduced with frame narrowing, it is possible to ensure a needed bonding strength.

Furthermore, the fixation member 21 is not welded to a region 16e that is located between the regions 16d to be welded in the region 16f on the principal surface 16c of the light guide plate 16, so that an air layer exists between the fixation member 21 and a plurality of regions 16e. Hence, it is possible to prevent the fixation member 21 from influencing traveling of light that is output from the light-emitting surface 14a of the LED 14.

Furthermore, the fixation member 22 is connected to the frame 11 not by welding but by bonding, so that a bonding strength per unit area between the frame 11 and the fixation member 22 is less than a bonding strength per unit area between the light guide plate 16 and the fixation member 21. Hence, it is possible to detach the light guide plate 16 in a state where the fixation member 21 is welded thereto from the frame 11 and it is possible to replace a unit that includes the light guide plate 16 without detaching the LED 14. Additionally, the fixation member 22 has a large surface area, and further, the one surface 22a is wholly bonded to the floor surface 11c of the frame 11, so that a strength of bonding between the fixation member 22 and the frame 11 is ensured.

Figure 5:
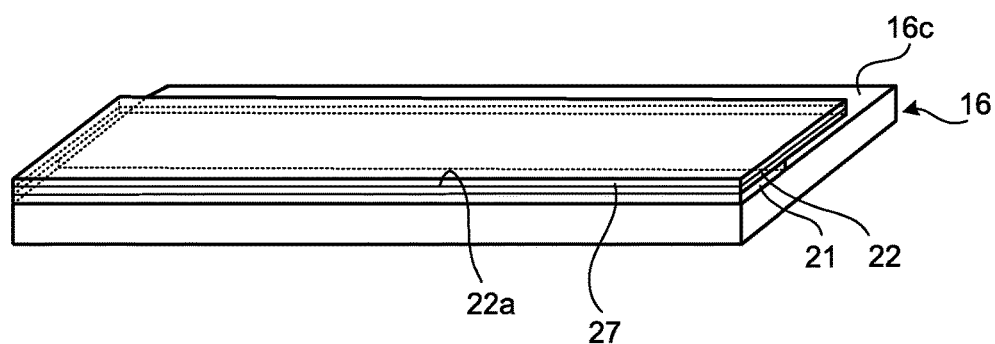
FIG. 5 is a diagram (1) illustrating an example of a method of welding a fixation member to a light guide plate according to an embodiment.
Figure 6:
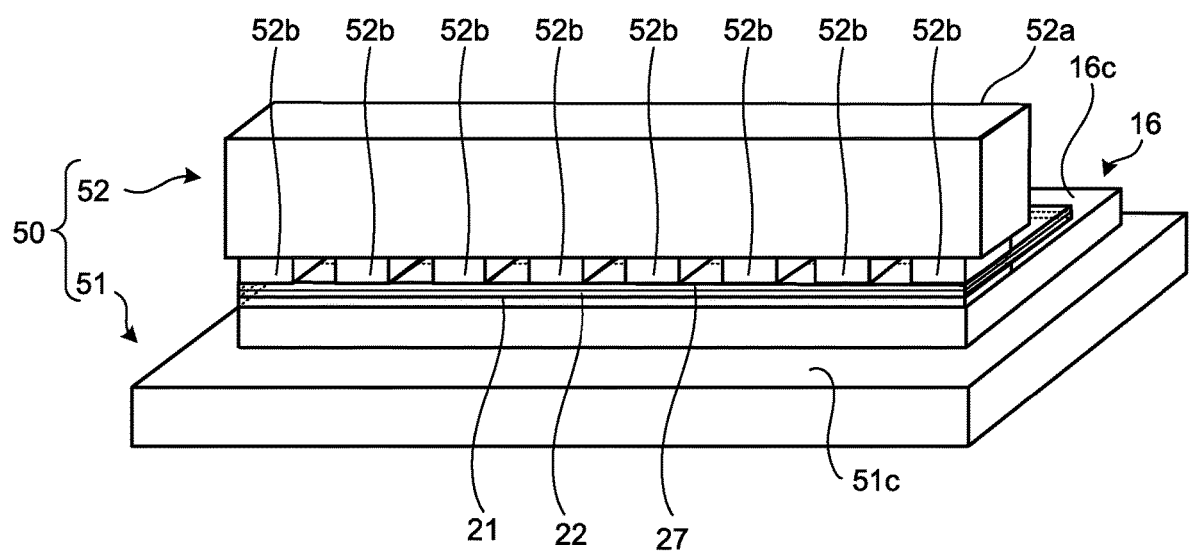
FIG. 6 is a diagram (2) illustrating an example of a method of welding a fixation member to a light guide plate according to an embodiment.
Figure 7:
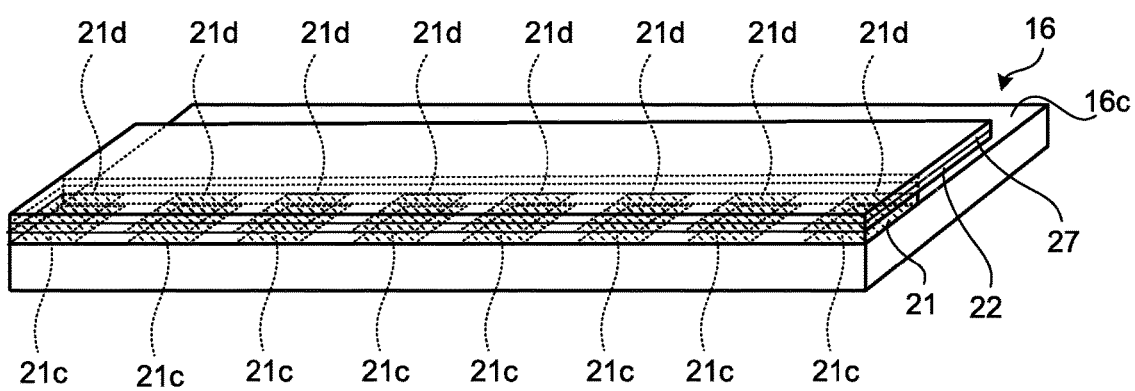
FIG. 7 is a diagram (3) illustrating an example of a method of welding a fixation member to a light guide plate according to an embodiment.

Herein, a method of welding the fixation member 21 to the light guide plate 16 will be explained as a method of manufacturing the planar illumination device 10 according to an embodiment. FIG. 5 to FIG. 7 are diagrams illustrating an example of a method of welding the fixation member 21 to the light guide plate 16 according to an embodiment.

As illustrated in FIG. 5, the fixation member 21, the fixation member 22, and a release paper 27 are arranged in sequence on the principal surface 16c of the light guide plate 16. Herein, the fixation member 21 is provided in a state where it faces the principal surface 16c of the light guide plate 16. Additionally, the release paper 27 is releasably attached to an adhesive layer that is formed on the one surface 22a of the fixation member 22.

Then, as illustrated in FIG. 6, the light guide plate 16 in a state where the fixation member 21 is mounted on the principal surface 16c is arranged on a flat surface 51c of an anvil 51 of an ultrasonic welding device 50. Subsequently, a horn 52 of the ultrasonic welding device 50 is pressed against the release paper 27 and the horn 52 is ultrasonically vibrated. In an example as illustrated in FIG. 6, the horn 52 is a member with a comb shape and includes a base part 52a with a rectangular parallelepiped shape and a plurality of teeth parts 52*b* with a rectangular parallelepiped shape that are provided under the base part 52*a* and arranged so as to be mutually spaced apart.

Each of the plurality of teeth parts 52*b* is arranged just under a corresponding region 16*d* among the plurality of regions 16*d* (see FIG. 4). Hence, as illustrated in FIG. 7, the plurality of regions 21*c* on the fixation member 21 that face the plurality of regions 16*d* are activated by ultrasonic vibration and welded to the plurality of regions 16*d* on the principal surface 16*c* of the light guide plate 16. Furthermore, a plurality of regions 21*d* on the one surface 21*a* of the fixation member 21 that are located above the plurality of regions 21*c* in FIG. 7 are activated and welded to the fixation member 22.

Thus, it is possible for the ultrasonic welding device 50 that has the anvil 51 and the horn 52 to execute a welding step of ultrasonically welding the fixation member 21 to the plurality of regions 16*d* on the light guide plate 16. The fixation member 21 is welded to the principal surface 16*c* of the light guide plate 16, so that it is possible to improve a bonding strength as compared with a case where an adhesive fixation member is bonded to the principal surface 16*c* of the light guide plate 16. Hence, it is possible to reduce a width of the region 16*d* where the fixation member 21 is bonded thereto, so that it is possible to attain further frame narrowing as compared with a case where an adhesive fixation member is bonded to the principal surface 16*c* of the light guide plate 16. Furthermore, the fixation member 21 is formed into a strip shape and is not separated so as to correspond to individual regions 16*d* but is formed as a continuum, so that handling thereof is facilitated. Therefore, it is possible to improve workability for assembly of the planar illumination device 10. Additionally, it goes without saying that the fixation member 21 may be divided into several pieces in a longitudinal direction of the side surface 16*a* of the light guide plate 16.

Furthermore, the plurality of regions 21*d* on the fixation member 21 are welded to the fixation member 22, so that it is possible to improve a strength of bonding between the fixation member 21 and the fixation member 22. Furthermore, a surface area of the one surface 22*a* of the fixation member 22 is greater than that of the one surface 21*a* of the fixation member 21 and such one surface 22*a* is wholly bonded to the floor surface 11*c* of the frame 11, so that it is possible to ensure a strength of bonding between the light guide plate 16 and the frame 11. Furthermore, the fixation member 22 is bonded to the floor surface 11*c* by an adhesive material, so that it is also possible to comparatively readily execute releasing thereof.

Figure 8:
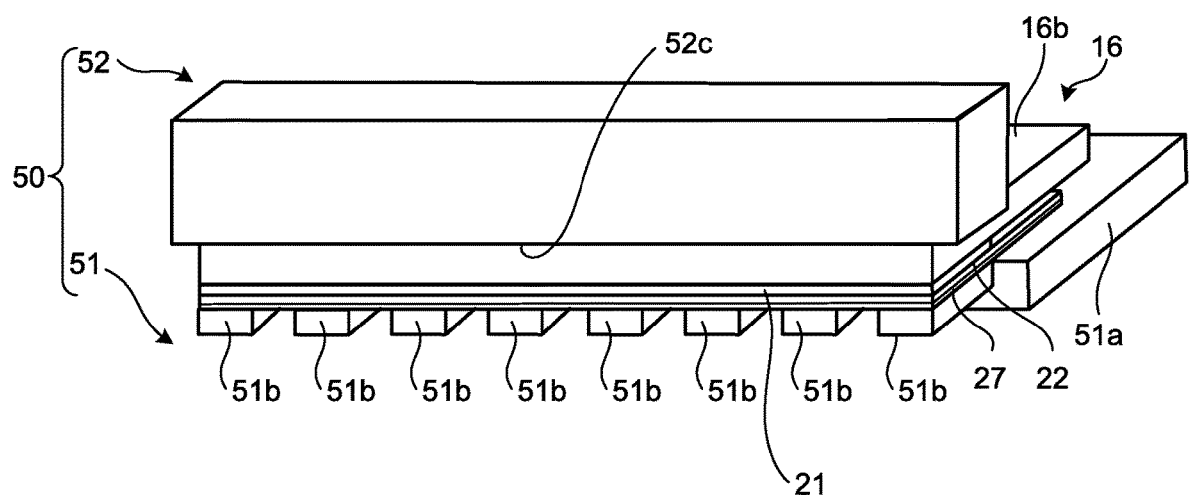
FIG. 8 is a diagram illustrating an example of a method of welding a fixation member to a light guide plate by using an ultrasonic welding device that is different from an ultrasonic welding device as illustrated in FIG. 6.

Although the horn 52 is formed into a comb shape and the anvil 51 is formed into a rectangular parallelepiped shape in an example as described above, shapes of the horn 52 and the anvil 51 are not limited to those of an example as illustrated in FIG. 6. FIG. 8 is a diagram illustrating an example of a method of welding the fixation member 21 to the light guide plate 16 by using an ultrasonic welding device 50 that is different from the ultrasonic welding device 50 as illustrated in FIG. 6.

An anvil 51 of the ultrasonic welding device 50 as illustrated in FIG. 8 is formed into a comb shape and includes a base part 51*a* with a rectangular parallelepiped shape and a plurality of teeth parts 51*b* with a rectangular parallelepiped shape that protrude from the base part 51*a* and are arranged so as to be mutually spaced apart. Furthermore, a horn 52 as illustrated in FIG. 8 is a member with a rectangular shape that has a flat surface 52*c* where the flat surface 52*c* faces the anvil 51.

The release paper 27, the fixation member 22, the fixation member 21, and the light guide plate 16 are laminated in sequence and arranged on a teeth part 51*b* of the anvil 51. Subsequently, the flat surface 52*c* of the horn 52 of the ultrasonic welding device 50 is pressed against the principal surface 16*b* of the light guide plate 16 and the horn 52 is ultrasonically vibrated.

Thereby, a region of the fixation member 21 that is interposed between each teeth part 51*b* of the anvil 51 and the flat surface 52*c* of the horn 52 is activated by ultrasonic vibration. Hence, similarly to a case of an example as illustrated in FIG. 6, the plurality of regions 21*c* (see FIG. 7) on the fixation member 21 that are located above each of the plurality of teeth parts 51*b* are welded to the plurality of regions 16*d* on the light guide plate 16. Furthermore, the plurality of regions 21*d* (see FIG. 7) on the fixation member 21 that are located above each of the plurality of teeth parts 51*b* are activated by ultrasonic vibration and welded to the fixation member 22.

In a case of the ultrasonic welding device 50 as illustrated in FIG. 8, a shape of the horn 52 that is ultrasonically vibrated is a simple shape. Hence, it is possible to use the horn 52 that is inexpensive as compared with a case where the horn 52 is of a comb shape, so that it is possible to reduce a manufacturing cost of the planar illumination device 10.

Figure 9:
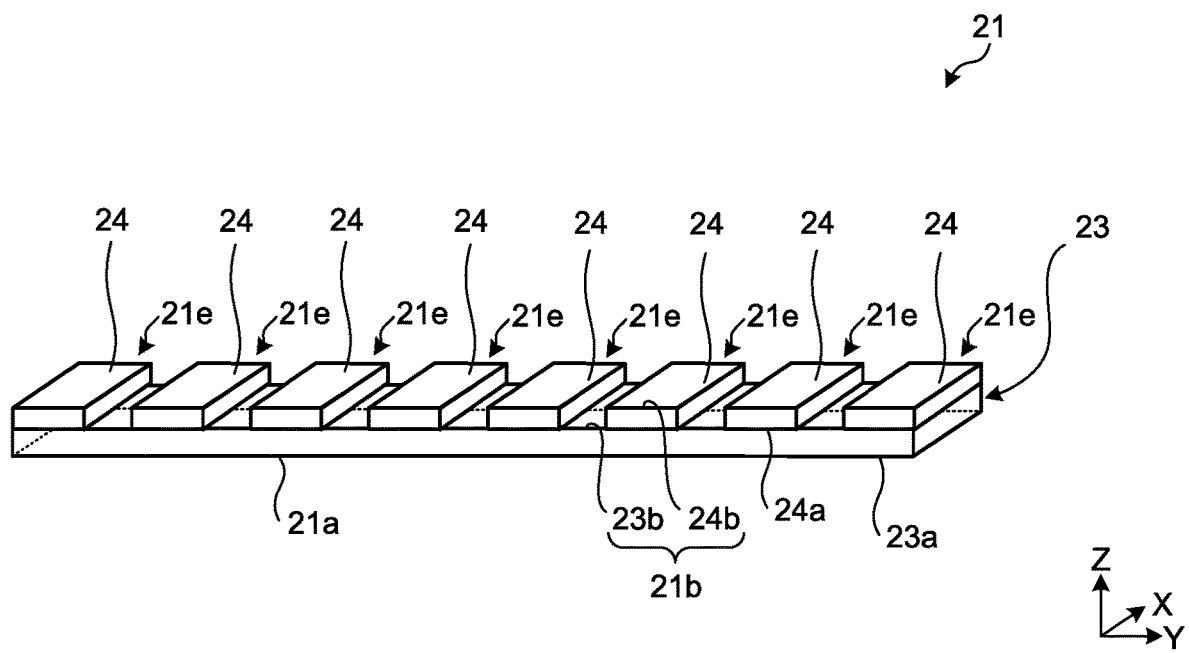
FIG. 9 is a diagram illustrating another configuration example of a fixation member according to an embodiment.
Figure 10:
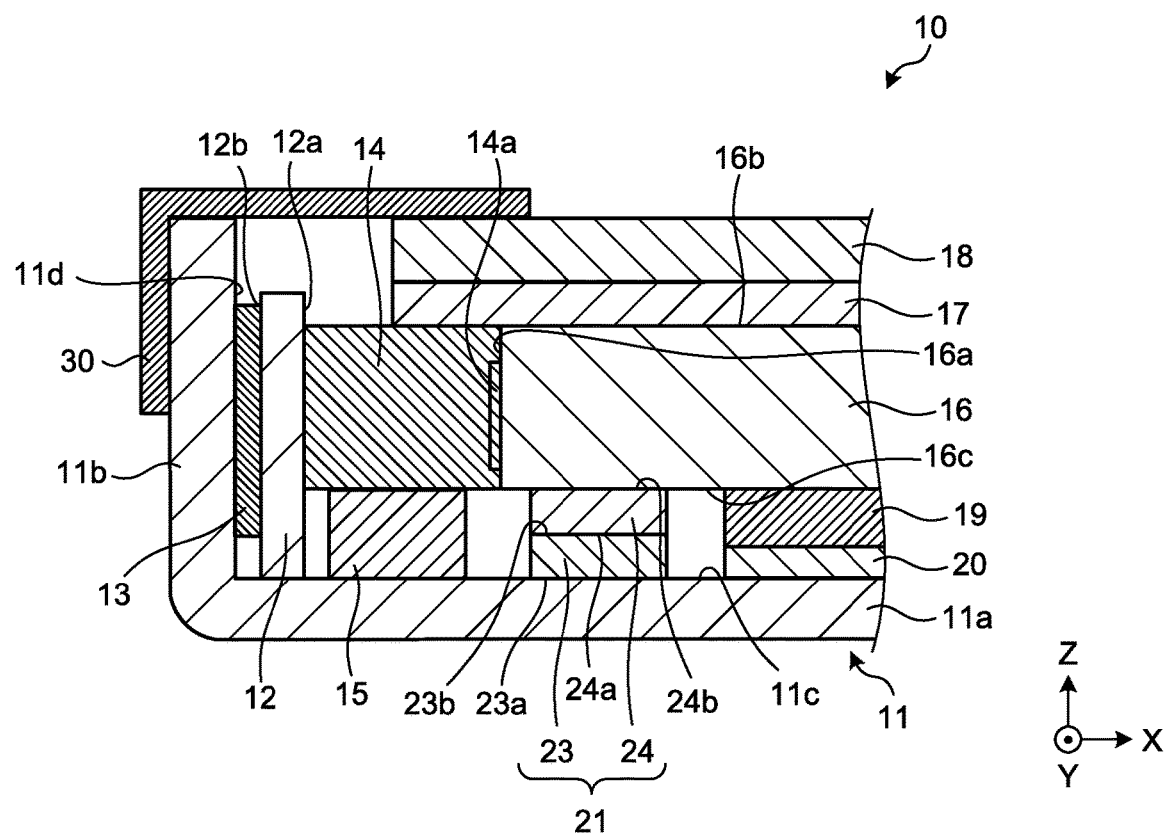
FIG. 10 is a diagram illustrating another example of a cross-section along line A-A in FIG. 1.

Furthermore, the fixation member 21 is not limited to a configuration as described above. FIG. 9 is a diagram illustrating another configuration example of the fixation member 21 according to an embodiment. FIG. 10 is a diagram illustrating another example of a cross-section along line A-A in FIG. 1 and illustrates an example in a case where a configuration is provided that uses the fixation member 21 as illustrated in FIG. 9.

The fixation member 21 as illustrated in FIG. 9 and FIG. 10 is a fixation member with a strip shape. Such a fixation member 21 is a member with a strip shape where one surface 21*a* thereof is a flat surface and a plurality of protrusion parts 21*e* are formed on the other surface 21*b* so as to be spaced apart in an array direction of the LED (a Y-axis direction).

In an example as illustrated in FIG. 10, the fixation member 21 includes a first connection member 23 with one surface 23*a* that is welded to the floor surface 11*c* of the frame 11 and a plurality of second connection members 24 with one surface 24*a* that is each welded to the other surface 23*b* of the first connection member 23 being arranged so as to be spaced apart in an array direction of the LED 14 (a Y-axis direction). Then, the plurality of protrusion parts 21*e* are formed by the plurality of second connection members 24. Additionally, the other surface 21*b* of the fixation member 21 as described above is composed of a part of the other surface 23*b* of the first connection member 23 and the other surface 24*b* of a second connection member 24.

The first connection member 23 is a thermal activation connection member that is activated at a low temperature (for example, 80 degrees to 100 degrees). For example, the first connection member 23 is a thermosetting elastomer (for example, a thermosetting-resin-type elastomer) or a thermoplastic elastomer. The one surface 23*a* of the first connection member 23 is welded to the floor surface 11*c* of the frame 11.

The second connection member 24 is a thermal activation member that is activated at a low temperature (for example, 80 degrees to 100 degrees), and is, for example, a thermal activation double-sided bonding tape. A thermal activation double-sided bonding tape is, for example, a thermal activation double-sided bonding film that does not have a base material but is composed of a low-temperature activation adhesive, a tape configured by applying a low-temperature activation adhesive on a polyurethane-coated paper or a polyethylene-coated paper, a tape configured by applying a low-temperature activation adhesive on an acrylic non-woven fabric, or the like. The other surface 24b of the second connection member 24 is welded to the principal surface 16c of the light guide plate 16.

Figure 11:
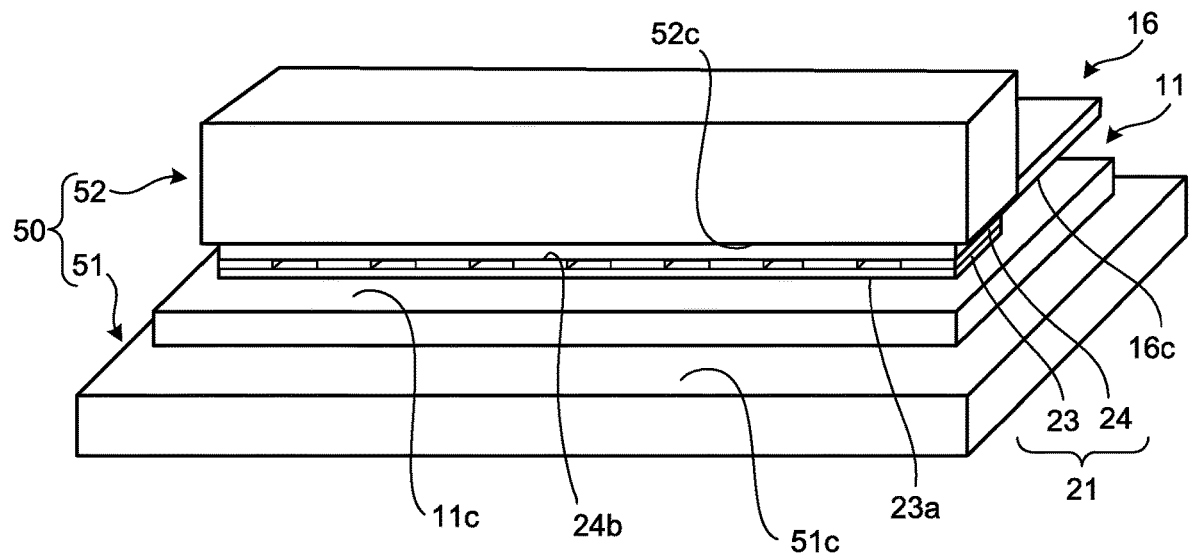
FIG. 11 is a diagram illustrating an example of a method of welding a fixation member as illustrated in FIG. 9 to a frame and a light guide plate according to an embodiment.

FIG. 11 is a diagram illustrating an example of a method of welding the fixation member 21 as illustrated in FIG. 9 to the frame 11 and the light guide plate 16 according to an embodiment. As illustrated in FIG. 11, in a state where the frame 11, the fixation member 21, and the light guide plate 16 are arranged in sequence on the flat surface 51c of the anvil 51 of the ultrasonic welding device 50, the flat surface 52c of the horn 52 is pressed against the light guide plate 16 and the horn 52 is ultrasonically vibrated.

Thereby, a plurality of regions on the one surface 23a of the first connection member 23 that are each located under the plurality of second connection members 24 are activated and welded to the floor surface 11c of the frame 11. Furthermore, the other surface 24b of each second connection member 24 is activated and welded to the principal surface 16c of the light guide plate 16. The fixation member 21 is formed into a strip shape and is not separated so as to correspond to the individual regions 16d, so that handling thereof is facilitated. Therefore, it is possible to improve workability for assembly of the planar illumination device 10.

In a case where the first connection member 23 is composed of an elastomer, the first connection member 23 that is welded to the frame 11 is readily detached from the frame 11 as compared with a case where the first connection member 23 is a thermal activation double-sided bonding tape. Hence, for example, it is possible to readily detach a unit that includes the light guide plate 16 (and includes the fixation member 21) from the planar illumination device 10 by reworking.

In an example as illustrated in FIG. 11, both shapes of the horn 52 and the anvil 51 are simple shapes, so that it is possible to use an inexpensive ultrasonic welding device as compared with a case where the horn 52 or the anvil 51 is of a comb shape and it is possible to reduce a manufacturing cost of the planar illumination device 10. Additionally, in a case where the fixation member 21 as illustrated in FIG. 9 is welded to the light guide plate 16 and the frame 11, one of the horn 52 or the anvil 51 may be of a comb shape. In such a case, the teeth part 51b or teeth part 52b is arranged at a position to coincide with the second connection member 24 in upward and downward directions.

Furthermore, although the plurality of second connection members 24 are arranged on the other surface 23b of the first connection member 23 in the fixation member 21 as illustrated in FIG. 9 and FIG. 10, such an example is not limiting. For example, the fixation member 21 may be configured to superimpose the second connection member 24 with a shape identical to that of the first connection member 23 in a plan view onto the other surface 23b of the first connection member 23. In such a case, the fixation member 21 is welded to the light guide plate 16 and the frame 11 by using the ultrasonic welding device 50 as illustrated in FIG. 6 or FIG. 8. Thereby, similarly to the fixation member 21 as illustrated in FIG. 9 and FIG. 10, it is also possible to readily detach a unit that includes the light guide plate 16 (and includes the fixation member 21) from the planar illumination device 10 at a time of reworking.

Figure 12:
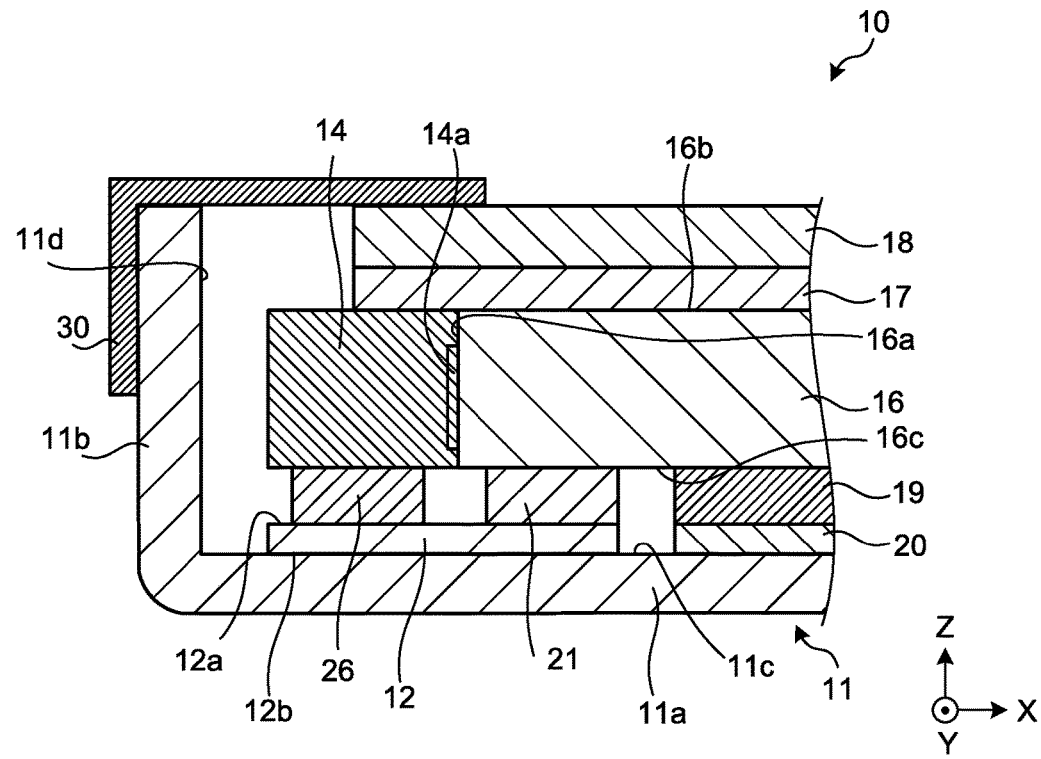
FIG. 12 is a diagram illustrating another example of a cross-section along line A-A in FIG. 1.
Figure 13:
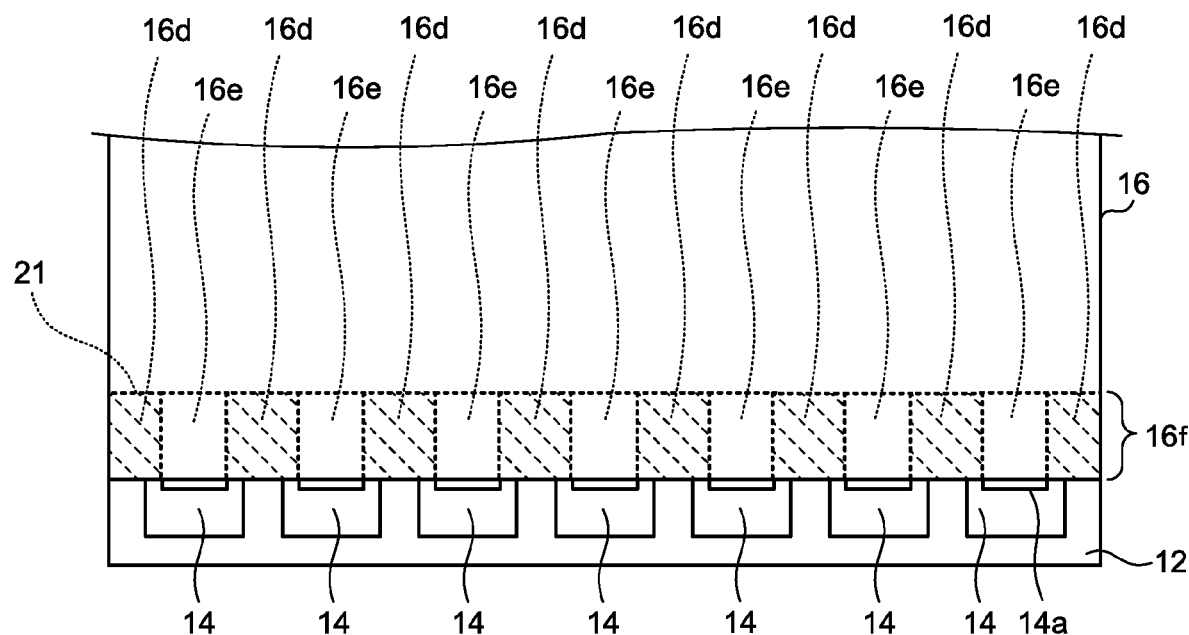
FIG. 13 is a diagram illustrating a relationship among an LED, a light guide plate, and a fixation member in a planar illumination device as illustrated in FIG. 12.
Figure 13:
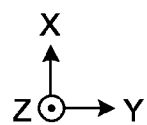

Although the planar illumination device 10 in an example as described above is configured to use a top-view-type LED, a configuration that uses a side-view-type LED may be provided. FIG. 12 is a diagram illustrating another example of a cross-section along line A-A in FIG. 1 and illustrates an example of a case where the planar illumination device 10 as illustrated in FIG. 1 is configured to use a side-view-type LED. FIG. 13 is a diagram illustrating a relationship among the LED 14, the light guide plate 16, and the fixation member 21 in the planar illumination device 10 as illustrated in FIG. 12. Additionally, a component that has a function similar to that of the planar illumination device 10 as illustrated in FIG. 2 will be provided with an identical sign to omit an explanation thereof and an explanation with a focus on a point different from the planar illumination device 10 as illustrated in FIG. 2 is provided.

The planar illumination device 10 as illustrated in FIG. 12 has a so-called side-view-type LED 14 where a light-emitting surface 14a thereof is orthogonal to a mounting surface for the FPC 12 and the FPC 12 is arranged at a position where a part of the principal surface 12a of the FPC 12 faces the light guide plate 16. The light guide plate 16 is fixed to the principal surface 12a of the FPC 12 by the fixation member 21 in a state where an optical axis of the light guide plate 16 coincides with an optical axis of the LED 14. Additionally, the LED 14 is mounted on the one principal surface 12a of the FPC 12 by a solder 26.

As illustrated in FIG. 12 and FIG. 13, the fixation member 21 is fixed to a part of the region 16f near the LED 14 on the principal surface 16c of the light guide plate 16. Specifically, the fixation member 21 is welded and fixed to the plurality of regions 16d on the light guide plate 16 that are each located anteriorly (in an X-axis positive direction) between two adjacent LEDs 14 in mutually different combinations and that are located so as to be spaced apart in an array direction of the plurality of LEDs 14 (in a Y-axis direction). Welding of the fixation member 21 to the plurality of regions 16d is executed by ultrasonic welding. Additionally, a region on the light guide plate 16 where the fixation member 21 is fixed is not limited to the principal surface 16c. For example, the FPC 12 may be arranged on a side of an output surface (the principal surface 16b). In such a case, the fixation member 21 is fixed on, for example, the principal surface 16b.

Thus, the fixation member 21 is welded to each of the light guide plate 16 and the FPC 12, so that it is possible to improve a strength of bonding to the light guide plate 16 and the FPC 12. Hence, even in a case where the region 16d on the light guide plate 16 that is used for fixation to the FPC 12 is reduced with frame narrowing, it is possible to ensure a needed bonding strength. Furthermore, the fixation member 21 is not welded to the region 16e that is located between the regions 16d, so that it is possible to prevent the fixation member 21 from influencing traveling of light that is output from the light-emitting surface 14a of the LED 14.

Figure 14:
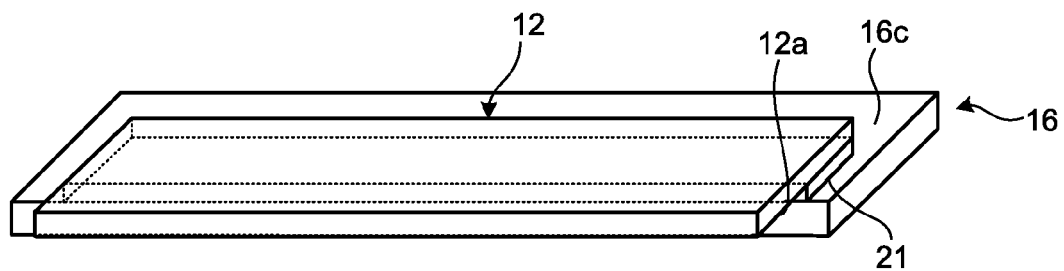
FIG. 14 is a diagram (1) illustrating an example of a method of fixing an FPC and a light guide plate according to an embodiment by using a fixation member.
Figure 15:
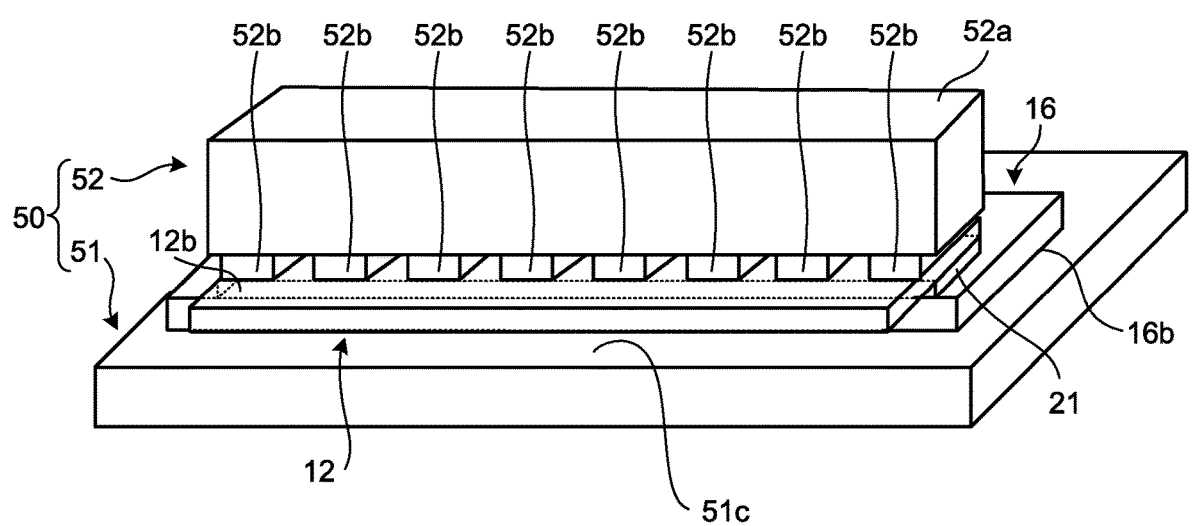
FIG. 15 is a diagram (2) illustrating an example of a method of fixing an FPC and a light guide plate according to an embodiment by using a fixation member.

Herein, a method of fixing the FPC 12 and the light guide plate 16 by using the fixation member 21 will be explained as a method of manufacturing the planar illumination device 10 as illustrated in FIG. 12 and FIG. 13. FIG. 14 and FIG. 15 are diagrams illustrating an example of a method of fixing the FPC 12 and the light guide plate 16 by using the fixation member 21 according to an embodiment.

As illustrated in FIG. 14, the fixation member 21 is arranged between the principal surface 12a of the FPC 12 and the principal surface 16c of the light guide plate 16. Additionally, in a case where the fixation member 21 is configured as illustrated in FIG. 9, a state is provided where the first connection member 23 of the fixation member 21 faces the principal surface 12a of the FPC 12 and the second connection member 24 of the fixation member 21 faces the principal surface 16c of the light guide plate 16.

Then, as illustrated in FIG. 15, the principal surface 16b of the light guide plate 16 where the FPC 12 is arranged above via the fixation member 21 is arranged on the flat surface 51c of the anvil 51. Subsequently, the horn 52 is pressed against the principal surface 12b of the FPC 12 and the horn 52 is ultrasonically vibrated. Each of the plurality of teeth parts 52b that are provided on the horn 52 is arranged just under a corresponding region 16d among the plurality of regions 16d (see FIG. 13).

Hence, as illustrated in FIG. 15, a plurality of regions on the fixation member 21 that face the plurality of regions 16d (see FIG. 13) are activated by ultrasonic vibration and welded to the plurality of regions 16d on the principal surface 16c of the light guide plate 16. Furthermore, a plurality of regions on the fixation member 21 that are located under each of the plurality of teeth parts 52b are activated by ultrasonic vibration and welded to the FPC 12. Additionally, an ultrasonic welding device is not limited to a configuration as illustrated in FIG. 15 and may be configured as illustrated in FIG. 8.

Thus, the fixation member 21 is welded to each of the light guide plate 16 and the FPC 12, so that it is possible to improve a bonding strength as compared with a case where an adhesive fixation member is bonded to each of the light guide plate 16 and the FPC 12. Hence, it is possible to reduce a width of the region 16d on the light guide plate 16 that is used for fixing the light guide plate 16 to the FPC 12, so that it is possible to attain further frame narrowing as compared with a case where an adhesive fixation member is bonded to the principal surface 16c of the light guide plate 16.

Furthermore, in a case where the fixation member 21 is configured as illustrated in FIG. 9 and the first connection member 23 is composed of an elastomer, the first connection member 23 that is welded to the FPC 12 is readily detached from the FPC 12 as compared with a case where the first connection member 23 is a thermal activation double-sided bonding tape. Hence, for example, it is possible to readily detach a unit that includes the light guide plate 16 (and includes the fixation member 21) from the planar illumination device 10 by reworking. Furthermore, the fixation member 21 may be configured to superimpose the second connection member 24 with a shape identical to that of the first connection member 23 in a plan view onto the other surface 23b of the first connection member 23. In such a case, it is possible to provide the first connection member 23 that is composed of an elastomer and the second connection member 24 that is a thermal activation double-sided bonding tape. That is, a configuration may be provided in such a manner that the fixation member 21 includes two layers with different bonding strengths per unit area and a bonding strength per unit area of a layer on a side of the light guide plate 16 (a layer that faces the light guide plate 16) among such two layers is greater than that of a layer on a side of the FPC 12 (a layer that faces the FPC 12). In such a case, it is also possible to readily detach a unit that includes the light guide plate 16 (and includes the fixation member 21) from the planar illumination device 10 by reworking.

Additionally, a method of manufacturing the planar illumination device 10 that uses a side-view-type LED does not have to include a welding step of welding the fixation member 21 to the FPC 12 as illustrated in FIG. 15. For example, for the fixation member 21, as illustrated in FIG. 6 or FIG. 8, the fixation member 21 where the fixation member 22 and the release paper 27 are attached thereto is welded to the light guide plate 16. Then, the release paper 27 is released and the one surface 22a of the fixation member 22 is bonded to the FPC 12.

Furthermore, although the light guide plate 16, the fixation member 21, the fixation member 22, and the release paper 27 are mounted on the anvil 51 in sequence and the horn 52 is pressed against the release paper 27 in an example as illustrated in FIG. 6, such an example is not limiting. For example, ultrasonic welding may be executed while the release paper 27, the fixation member 22, the fixation member 21, and the light guide plate 16 are mounted on the anvil 51 in sequence and the horn 52 is pressed against the light guide plate 16. That is, a sequence of the light guide plate 16, the fixation member 21, the fixation member 22, and the release paper 27 that are arranged on the anvil 51 may be a reverse sequence with respect to a sequence as illustrated in FIG. 6. Similarly, this also applies to a case of the ultrasonic welding device 50 as illustrated in FIG. 8.

Furthermore, the frame 11, the fixation member 21, and the light guide plate 16 are mounted on the flat surface 51c of the anvil 51 in sequence and the horn 52 is pressed against the light guide plate 16 in an example as illustrated in FIG. 11, such an example is not limiting. For example, ultrasonic welding may be executed while the light guide plate 16, the fixation member 21, and the frame 11 are mounted on the anvil 51 in sequence and the horn 52 is pressed against the frame 11.

Similarly, although the light guide plate 16, the fixation member 21, and the FPC 12 are mounted on the flat surface 51c of the anvil 51 in sequence and the horn 52 is pressed against the FPC 12 in an example as illustrated in FIG. 15, such an example is not limiting. For example, ultrasonic welding may be executed while the FPC 12, the fixation member 21, and the light guide plate 16 are mounted on the anvil 51 in sequence and the horn 52 is pressed against the light guide plate 16.

As above, the planar illumination device 10 according to an embodiment includes the fixation member 21 with a strip shape that is arranged between the light guide plate 16 and another member (for example, the fixation member 22, the frame 11, or the FPC 12) and fixes the light guide plate 16 to the other member. Then, the fixation member 21 is bonded to the plurality of regions 16d on the light guide plate 16 that are each located anteriorly between the two adjacent LEDs 14 in mutually different combinations and that are located so as to be spaced apart in an array direction of the plurality of LEDs 14 (Y-axis direction). In such a planar illumination device 10, the fixation member 21 is formed into a strip shape and is not separated so as to correspond to individual regions 16d but is formed as a continuum. Hence, it is possible to improve workability for assembly of the planar illumination device 10. Furthermore, the fixation member 21 is bonded to the light guide plate 16 by welding, so that it is possible to improve a strength of bonding to the light guide plate 16 and it is possible to realize further frame narrowing. Additionally, the fixation member 21 is not limited to shapes as illustrated in FIG. 3 and FIG. 9, and a shape other than the shapes as illustrated in FIG. 3 and FIG. 9 may be provided as long as it is formed into a strip shape. For example, a concave-convex surface or a serpentine surface may be provided on the one surface 21a of the fixation member 21. Furthermore, for example, a concavity and a convexity or a serpentine curve may be provided on a side edge of the fixation member 21. Thus, it is sufficient that the fixation member 21 is of a shape that includes a part with a strip shape that is capable of covering the plurality of regions 16d integrally, where, for example, a shape with a protruding part, a concave-convex surface, a serpentine surface, or the like may be provided on at least one of the one surface 21a, the other surface 21b, and a side edge.

Additionally, although the fixation member 21 as described above is configured to include a thermal activation member that is activated at a low temperature (for example, 80 degrees to 100 degrees), a configuration that includes a thermal activation member that is activated at 80 degrees or lower or at 100 degrees or higher may be provided.

Furthermore, although the fixation member 21 as illustrated in FIG. 9 is composed of the first connection member 23 and the second connection member 24 that are of mutually different kinds, it is also possible to form the fixation member 21 into a strip shape that has the plurality of protrusion parts 21e by one kind of member.

Furthermore, although the fixation member 21 is configured to include a thermal activation member and such a thermal activation member is activated by ultrasonic vibration to execute welding of the fixation member 21 to the light guide plate 16 in the embodiment as described above, such an example is not limiting. That is, it is sufficient that it is possible for the fixation member 21 to improve a strength of bonding to the light guide plate 16, a configuration that does not include a thermal activation member may be provided. Furthermore, boding of the fixation member 21 to the light guide plate 16 is not limited to ultrasonic welding, where, for example, laser welding may be executed or vibration other than ultrasonic vibration may be executed.

Furthermore, a bonding step of bonding the fixation member 21 to the plurality of regions 16d of the light guide plate 16 and the fixation member 22 may be thermal compression boding of the fixation member 21 to the plurality of regions 16d of the light guide plate 16 and the fixation member 22 instead of ultrasonic welding. In such a case, where directions orthogonal to the one surface 21a and the other surface 21b of the fixation member 21 are upward and downward directions, a (non-illustrated) thermal compression bonding device heats the respective regions 21c, 21d while a pressure in upward and downward directions is applied to the respective regions 21c, 21d, so that the fixation member 21 is bonded to the plurality of regions 16d and the fixation member 22.

For example, the light guide plate 16, the fixation member 21, the fixation member 22, and the release paper 27 in a state as illustrated in FIG. 5 are mounted on a stage of a thermal compression bonding device in such a manner that the light guide plate 16 is downside. Then, in a thermal compression bonding device, a region on the release paper 27 that faces the region 16d (a region except the plurality of regions 16e) in upward and downward directions is heated while a pressure is applied thereto, so that it is possible to bond the fixation member 21 to the plurality of regions 16d of the light guide plate 16 and the fixation member 22. Thereby, it is also possible to improve a bonding strength. Additionally, it is also possible to heat a mounting surface of the light guide plate 16 on a stage of a thermal compression bonding device. In such a case, for example, it is possible to provide a stage of a thermal compression bonding device that is configured to heat a region that faces the respective regions 16d on the light guide plate 16 (regions except the plurality of regions 16e) in upward and downward directions.

Additionally, in a case where the fixation member 21 is an elastomer that has an adhesive property, the fixation member 21 may be pressure-bonded to the plurality of regions 16d on the light guide plate 16 and the fixation member 22 without applying heat thereto, instead of thermal compression bonding. In such a case, if directions orthogonal to the one surface 21a and the other surface 21b of the fixation member 21 are upward and downward directions, a (non-illustrated) pressure bonding device applies a pressure in upward and downward directions to the respective regions 21c, 21d so that the fixation member 21 is bonded to the plurality of regions 16d and the fixation member 22. Thereby, it is also possible to improve a bonding strength.

Furthermore, although the LED 14 is explained as an example of a light source in the embodiment as described above, such a light source is not limited to the LED 14 and another point-like light source may be provided.

According to an aspect of the present invention, it is possible to provide a planar illumination device and a method of manufacturing a planar illumination device that are capable of improving workability for assembly thereof.

Furthermore, the present invention is not limited by an embodiment(s) as described above. A configuration provided by appropriately combining respective components as described above is also included in the present invention. Furthermore, it is possible for a person skilled in the art to readily derive an additional effect(s) or variation(s). Hence, a broader aspect of the present invention is not limited to an embodiment(s) as described above and various modifications thereto are possible.

What is claimed is:

1. A planar illumination device, comprising:
    a light guide plate that outputs light that is incident on a side surface thereof from one principal surface among two principal surfaces thereof;
    a plurality of light sources that face the side surface, are arrayed in a longitudinal direction of the side surface, and have light-emitting surfaces that emit light that is incident on the side surface; and
    a fixation member with a strip shape that is arranged between the light guide plate and another member and fixes the light guide plate to the other member, wherein
    the fixation member is bonded to a plurality of regions on the light guide plate that are each located anteriorly between two adjacent light sources in mutually different combinations and that are located to be spaced apart in an array direction of the plurality of light sources, the fixation member being not separated so as to correspond to the regions individually and formed as a continuum.

2. The planar illumination device according to claim 1, wherein
    a surface forming part of the fixation member that faces the light guide plate is a flat surface without any protrution parts,
    a side edge forming part of the fixation member that faces the plurality of light sources is formed without any concave-convex surface where the the plurality of light sources are placed, and
    a plurality of regions on the flat surface that are located to be spaced apart in an array direction of the plurality of light sources are bonded to the plurality of regions on the light guide plate.

3. The planar illumination device according to claim 1, wherein a plurality of protrusion parts are formed on the fixation member to be spaced apart in the array direction, and the plurality of protrusion parts are bonded to the plurality of regions, respectively.

4. The planar illumination device according to claim 3, wherein the fixation member includes: a first connection member with one surface that is bonded to the other member; and a plurality of second connection members that are bonded to the other surface of the first connection member and arranged to be spaced apart in the array direction, and the plurality of protrusion parts are formed by the plurality of second connection members.

5. The planar illumination device according to claim 1, further comprising: a substrate that has two principal surfaces where surfaces of the light sources on an opposite side of the light-emitting surfaces are mounted on one principal surface thereof; and a frame that stores the light guide plate, the light sources, and the substrate, wherein the fixation member fixes the light guide plate while the frame or a fixation member that is bonded to the frame is provided as the other member.

6. The planar illumination device according to claim 1, further comprising a substrate with a part that faces the light guide plate where the plurality of light sources are arrayed thereon, wherein the fixation member fixes the light guide plate while the substrate is provided as the other member.

7. The planar illumination device according to claim 6, wherein the fixation member includes two layers with different bonding strengths per unit area, and a bonding strength per unit area of a layer on a side of the light guide plate among the two layers is greater than that of a layer on a side of the substrate.

8. The planar illumination device according to claim 1, wherein the fixation member is arranged between the other principal surface of the light guide plate and the other member.

9. The planar illumination device according to claim 1, wherein the fixation member is arranged between the one principal surface of the light guide plate and the other member.

10. A method of manufacturing the planar illumination device according to claim 1, comprising bonding the fixation member to the plurality of regions on the light guide plate.

11. A planar illumination device, comprising:
a light guide plate that outputs light that is incident on a side surface thereof from one principal surface among two principal surfaces thereof;
a plurality of light sources that face the side surface, are arrayed in a longitudinal direction of the side surface, and have light-emitting surfaces that emit light that is incident on the side surface;
a first fixation member with a strip shape that is arranged between the light guide plate and another member and fixes the light guide plate to the other member,
a substrate that has two principal surfaces where surfaces of the light sources on an opposite side of the light-emitting surfaces are mounted on one principal surface thereof; and
a frame that stores the light guide plate, the light sources, and the substrate, wherein
the first fixation member fixes the light guide plate while a second fixation member that is bonded to the frame is provided as the other member, and
a bonding strength per unit area between the frame and the second fixation member is less than a bonding strength per unit area between the light guide plate and the first fixation member.

12. A planar illumination device, comprising:
a light guide plate that outputs light that is incident on a side surface thereof from one principal surface among two principal surfaces thereof;
a plurality of light sources that face the side surface, are arrayed in a longitudinal direction of the side surface, and have light-emitting surfaces that emit light that is incident on the side surface;
a fixation member with a strip shape that is arranged between the light guide plate and another member and fixes the light guide plate to the other member, and
a substrate with a part that faces the light guide plate where the plurality of light sources are arrayed thereon, wherein
the fixation member
the fixation member fixes the light guide plate while the substrate is provided as the other member, and
the fixation member includes two layers with different bonding strengths per unit area, and a bonding strength per unit area of a layer on a side of the light guide plate among the two layers is greater than that of a layer on a side of the substrate.

13. The planar illumination device according to claim 1, wherein any part of the fixation member is not bonded to a region between the regions on the light guide plate, the region being bonded with the fixation member.

* * * * *